US006993496B2

(12) United States Patent
Pittelli

(10) Patent No.: US 6,993,496 B2
(45) Date of Patent: Jan. 31, 2006

(54) METHOD AND SYSTEM FOR DETERMINING MARKET DEMAND BASED ON CONSUMER CONTRIBUTIONS

(75) Inventor: Patrick Pittelli, Los Angeles, CA (US)

(73) Assignee: Boombacker, Inc., West Hollywood, CA (US)

( * ) Notice: Subject to any disclaimer, the term of this patent is extended or adjusted under 35 U.S.C. 154(b) by 0 days.

(21) Appl. No.: 09/888,004

(22) Filed: Jun. 22, 2001

(65) Prior Publication Data

US 2002/0198763 A1 Dec. 26, 2002

(51) Int. Cl.
*G06F 17/60* (2006.01)

(52) U.S. Cl. .............................. 705/10; 705/1; 705/12; 705/14

(58) Field of Classification Search .................... 705/1, 705/7, 10, 12, 14, 26
See application file for complete search history.

(56) References Cited

U.S. PATENT DOCUMENTS

| | | | | |
|---|---|---|---|---|
| 5,237,157 | A * | 8/1993 | Kaplan ....................... | 235/375 |
| 5,629,867 | A * | 5/1997 | Goldman ..................... | 381/77 |
| 5,963,916 | A * | 10/1999 | Kaplan ........................ | 705/26 |
| 6,067,562 | A * | 5/2000 | Goldman .................... | 709/206 |
| 6,578,008 | B1 * | 6/2003 | Chacker ..................... | 705/10 |
| 2001/0025259 | A1 * | 9/2001 | Rouchon ..................... | 705/26 |
| 2002/0038221 | A1 * | 3/2002 | Tiwary et al. ................. | 705/1 |
| 2002/0077963 | A1 * | 6/2002 | Fujino et al. ................. | 705/37 |
| 2002/0116215 | A1 * | 8/2002 | Lawrence et al. ............. | 705/1 |
| 2002/0123924 | A1 * | 9/2002 | Cruz ........................... | 705/10 |
| 2003/0018559 | A1 * | 1/2003 | Chung et al. ................. | 705/37 |
| 2003/0195795 | A1 * | 10/2003 | Chacker ...................... | 705/10 |

FOREIGN PATENT DOCUMENTS

JP 411168464 A * 6/1999

OTHER PUBLICATIONS

McIntosh, Christian, "Bands and fans rub elbows on Riffage.com", Cnn.com, Jun. 9, 1999 [retrieved on Oct. 28, 2002], 3 pages, retrieved from: Google.com.*

"7Up launches one-of-a-kind Internet music program", Business Wire, Aug. 21, 1996 [retrieved on Aug. 25, 2002], 2 pages, retrieved from: Dialog.*

Borland, John, "Riffage.com picks up indie record label", CNet News.com, Jul. 7, 2000 [retrieved on Oct. 28, 2002], 2 pages, retrieved from: Google.com.*

Lee, Hane C., "Curtain Closes for Riffage.com", The Industry Standard, Dec. 10, 2000 [retrieved on Oct. 28, 2002], 2 pages, Retrieved from: Google.com.*

Screenshot, Riffage.com, Oct. 12, 1999 [retrieved on Oct. 28, 2002], 3 pages, retrieved from: www.archive.org.*

(Continued)

*Primary Examiner*—Susanna M. Diaz
*Assistant Examiner*—B. Van Doren
(74) *Attorney, Agent, or Firm*—Wilmer Cutler Pickering Hale and Dorr LLP

(57) ABSTRACT

The present invention provides a method and a system to determine a market need before any monies are spent to produce and commercialize an artist. A method and system for determining the market demand for an artist comprising: receiving user input to determine which artist to select from a pool of artists; determining the market demand for said selected artist based on users contributing to a fund for said artist; and producing selected artists that attain a predefined level of user contributions.

22 Claims, 7 Drawing Sheets

OTHER PUBLICATIONS

"Musicosm launches the first interactive MP3 Record Label", www.hitsquad.com, May 12, 1999 [retrieved Oct. 25, 2002], 3 pages, retrieved from: Google.com.*

Dunphy, Laura, "Universal Label helps unsigned bands win an online audience", Los Angeles Business Journal, Feb. 21, 2000 [retrieved on Oct. 25, 2002], 3 pages, retrieved from: Dialog.*

"VH1's New Reality Based Series 'Bands on the Run'", PR Newswire, Nov. 13, 2000 [retrieved Oct. 25, 2002], 2 pages, retrieved from: Dialog.*

Treffiletti, Corey, "IUMA Partners with Listen.com to provide artists with iuma's website creation tools", www.iuma.com, Jan. 4, 2000 [retrieved Oct. 28, 2002], 2 pages, retrieved from: Google.com.*

Entertainment Editors, "Internet Music Fans vote for their favorite unsigned artists and enter to win prizes in the first annual demo derby", Business Wire, Jun. 3, 1997 [retrieved on Oct. 25, 2002], 2 pages, retrieved from: Dialog.*

"TV media goes from covering the news to making it", PR Newswire, Mar. 21, 1991 [retrieved on Oct. 28, 2002], 2 pages, retrieved from: Dialog.*

"Welcome!", www.garageband.com, Nov. 28, 1999 [retrieved Feb. 5, 2004], 2 pages, retrieved from: Google.com and archive.org.*

Callahan, Rick, "'Streaming' to a record deal", Star Tribune, Jan. 23, 2001 [retrieved Jun. 28, 2004], pp. 1-2, retrieved from: Proquest Direct.* loudEnergy.com, www.loudEnergy.com, Jan. 25, 2001-Apr. 17, 2001 [retrieved Jun. 28, 2004], pp. 1-12, retrieved from: Archive.org and google.com.*

"SRSWOWcast.com and LoudEnergy.com Form Content and Marketing Alliance", PR Newswire, Jun. 1, 2000 [retrieved Jun. 28, 2004], pp. 1-2, retrieved from: Proquest Direct.*

"loudEnergy.com Takes Bold New Approach", Business Wire, Jun. 27, 2000 [retrieved Jun. 28, 2004], p. 1-2, retrieved from: Proquest Direct.*

"Demo Derby: Internet music fans vote for their favorite unsigned artists", Business Wire, Jun. 3, 1997 [retrieved Oct. 28, 2002], 2 pages, retrieved from: Dialog, file 810.*

Robischon, Noah, "Farm Stand", Entertainment Weekly, Oct. 13, 2000 [Jun. 28, 2004], pp. 1-2, retrieved from: Proquest Direct.*

Botwin, Michael, "Cybertainment; Farmclub pumps up its music offerings", Los Angeles Time, Nov. 3, 2000 [retrieved Jun. 28, 2004], pp. 1-2, retrieved from: Proquest Direct.*

"Sonic Foundry Sponsors 'Born on the World Wide Web'", PR Newswire, Aug. 3, 1999 [retrieved Oct. 28, 2002], pp. 1-2, retrieved from: Archive.org and google.com.*

Laue, Christine, "Label-Innovating Band Bringing act to Omaha", Omaha World-Herald, Mar. 15, 2001 [retrieved Jun. 28, 2004], pp. 1-3, retireved from: Proquest.*

Dyson, Esther, "Creativity Sparkles in myriad business ideas", South China Morning Post, Sep. 12, 2000 [retrieved Jul. 21, 2005], pp. 1-3, retrieved from: Dialog, file 20.*

Pennock, 2001, "The Power of Play", Hollywood Stock Exchange, http://www.hsx.com/about/press/010244_1.html.

"About HSX", http://www.hsx.com/about/.

McIntosh, C., "Bands and fans rub elbows of Riffage.com", CNN.com, Jun. 9, 1999, 2 pages.

"7Up Launches one-of-a-kind Internet Music Program", Business Wire, Aug. 21, 1996, 2 pages.

Borland, John, "Riffage.com picks up indie record label", CNet News.com, Jul. 7, 2000, 2 pages.

Lee, Hane C., "Curtain Closes for Riffage.com", The Industry Standard, Dec. 10, 2000, 2 pages.

Riffage.com Screenshot, www.archive.org, Oct. 1999, 3 pages.

"Musicosm launches first interactive MP3 record label"+, www.hitsquad.com, May 12, 1999, 3 pages.

Dunphy, L., "Universal Label Helps unsigned bands win online audience", Los Angeles Business Journal, Feb. 21, 2000, 3 pages.

"TV Media go from covering the news to making it", PR Newswire, Mar. 21, 1991, 2 pages.

"VH1's New Reality Based Series: 'Bands on the Run'", PR Newswire, Nov. 13, 2000, 2 pages.

* cited by examiner

METHOD AND SYSTEM FOR DETERMINING MARKET DEMAND BASED ON CONSUMER CONTRIBUTIONS

BACKGROUND OF THE INVENTION

1. Field of the Invention

The invention relates in general to a method and a system for producing and commercializing artists, and in particular to a consumer based method and system for determining which artist(s) to promote and commercialize.

2. Description of Related Art

The current model for promoting and developing artists is based on a top down structure. Under the current model, a few individuals, usually executives from large media companies, make determinations on which new artist to promote and commercialize. Based on the selections of these individuals, a company will promote the artist's product. Once promoted, the company invests money to market the product to the consuming public.

The existing model has the drawback that it is financially risky because a significant amount of money is invested before the product is sold and before the market for the product necessarily exists. Further, even after the artist is promoted and attempts to commercialize the artist are made, there is no guarantee that a market will ever exist for that particular artist. What is needed is a way to discover the market for the artist before monies are invested.

SUMMARY OF THE INVENTION

The present invention provides a method and a system to determine a market need before any monies are spent to promote and commercialize an artist. An artist in the present invention includes, but not by way of limitation, musical groups, musicians, comedians, athletes, film makers, writers, directors, painters, photographers and the like. Once the existence of a market is determined for an artist, the prospect of investing money to promote and commercialize the artist becomes significantly less risky. The present invention provides a method and a system that allows consumers and artists to come together in a common marketplace. In the method and system of the present invention, consumers explore the offerings of artists and select the artist that they most enjoy. They also have the option to support the development, and ultimately the commercialization, of the artist by contributing a fixed sum of money for the benefit of the artist through an account managed by the method and system of the present invention. Once the artist reaches a predefined level of financial support from consumers, the consumer funds become available to produce and commercialize the artist.

The method and system of the present invention also provides a system of aggregating information to allow an artist more efficient distribution of their product.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides a method and a system for determining market demand for an artistic product before money is spent to produce and commercialize the artistic product. The method and system of the present invention allow consumers to financially contribute towards the development and commercialization of an artist of their choice.

Figure 1A:
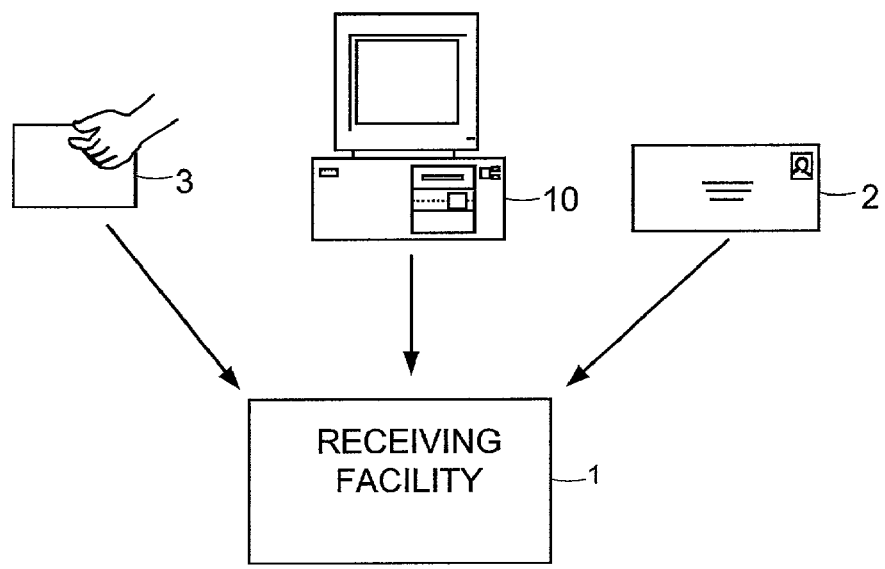
FIG. 1A is diagram illustrating methods for receiving artists' work samples.
Figure 1B:
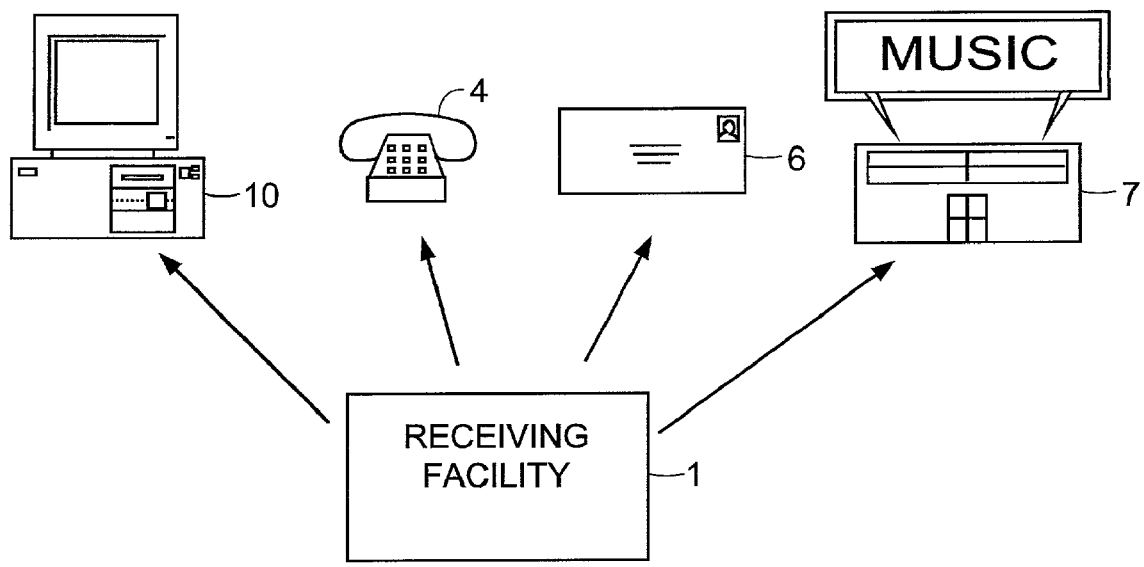
FIG 1B is a diagram illustrating methods for consumer review of artists' work samples.

One preferred embodiment of the present invention allows artists to submit samplings of their work to administrators practicing the present method and system. FIG. 1A illustrates how artists can submit samplings of their work to a receiving facility through numerous mechanisms such as the mail system 2, including U.S. Postal Service, DHL, and Federal Express; hand courier 3; and/or the Internet 10. Consumers or fans review the offerings of artists and have the option to financially contribute in the development and commercialization of a particular artist or artists. FIG 1B illustrates the various methods consumers can become aware and review artists' offerings as maintained by the receiving facility 1. These methods include: telephonic 4; Internet 10; direct mailings 6; and/or retail store 7.

Another preferred embodiment of the present invention is a computer implemented "BoomBacker™ system," which allows artists to submit demo tapes or other samplings of their work to BoomBacker. Consumers or fans review the offerings of artists and have the option to financially contribute to the development and commercialization of a particular artist or artists. The contributions are managed by BoomBacker. Once the artist receives a predefined level of financial support the funds can be used for commercializing the artist to, but not by way of limitation, record an album, touring, merchandising, marketing and/or the financial security for the artist's future. For fans who contribute to an artist that reaches a predefined level of financial support or becomes "BoomBacked™," that fan is eligible for certain membership privileges associated with the BoomBacked artist. Privileges include, but not by way of limitation, discounts on merchandise associated with the artist, advance notice of tour dates, discounts on concert tickets and music, access to privileged information about that artist as well as "reality" video and film highlighting the artist's personal life and career, opportunities to meet and chat with the artist at special receptions before personal appearances. If, however, the artist selected by the fan fails to become BoomBacked the fan's contributions can either be refunded or transferred to another artist. Alternatively, the fan can elect to keep the funds in the BoomBacker system, in a non-artist account for a predetermined period of time.

Hardware

Figure 2:
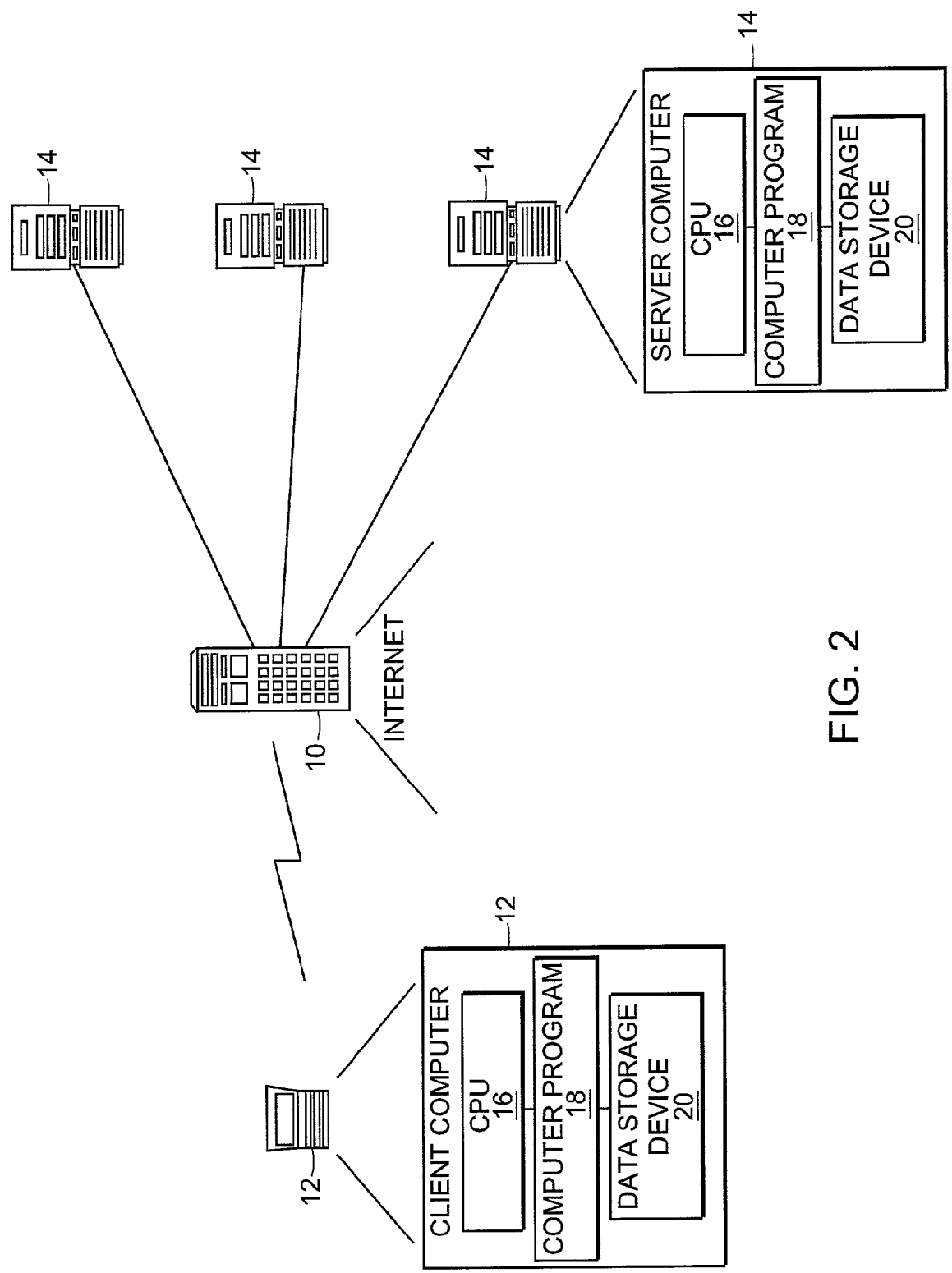
FIG. 2 is a block diagram of an exemplary hardware environment of the preferred embodiment of the present invention.

FIG. 2 illustrates a typical distributed computer system using the Internet 10 to connect client computers 12 executing, for example, a Web browser, to server computers 14 executing a computer program embodying the present invention. A typical combination of resources may include client computers 12 that are personal computers or work stations connected over the Internet 10 to server computers 14 that are personal computers, work stations, minicomputers, or mainframes.

Generally, both the client computers 12 and the server computers 14 are composed of one or more CPUs, various amounts of RAM 20 storing computer programs and other data, and other components typically found in computers. In addition, both the client computers 12 and the server computers 14 can include one or more monitors, and fixed or removable data storage devices 20 such as hard disk drives, floppy disk drives, and/or CD-ROM or other optical drives. Also included can be input devices such as mouse pointing devices and keyboards.

Both the client computers 12 and the server computers 14 operate under the control of an operating system, such as Windows®, Macintosh®, UNIX, Linux, etc. Further, both the client computers 12 and the server computers 14 each execute one or more computer programs 18 under the control of their respective operating systems. The present invention is preferably enabled in one or more computer programs 18 executed by the server computer 14, although in alternative embodiments these computers programs 18 can be executed on the client computer 12.

Generally, the computer programs 18 implementing the present invention are tangibly embodied in a computer readable medium, for example, is one or more of the fixed and/or removable data storage devices 20 attached to the computer. Under control of the operating system, the computer programs 18 are loaded from the data storage devices 20 into the RAM of the computer for subsequent execution by the CPU 16. The computer programs 18 comprise instructions which, when read and executed by the computer, cause the computer to perform the steps necessary to execute the steps or elements of the present invention.

Those skilled in the art will recognize that the exemplary environment illustrated in FIG. 2 is not intended to limit the present invention. Indeed, those skilled in the art will recognize that other alternative hardware environments can be used without departing from the scope of the present invention.

Logic of the Artist Process

Figure 3:
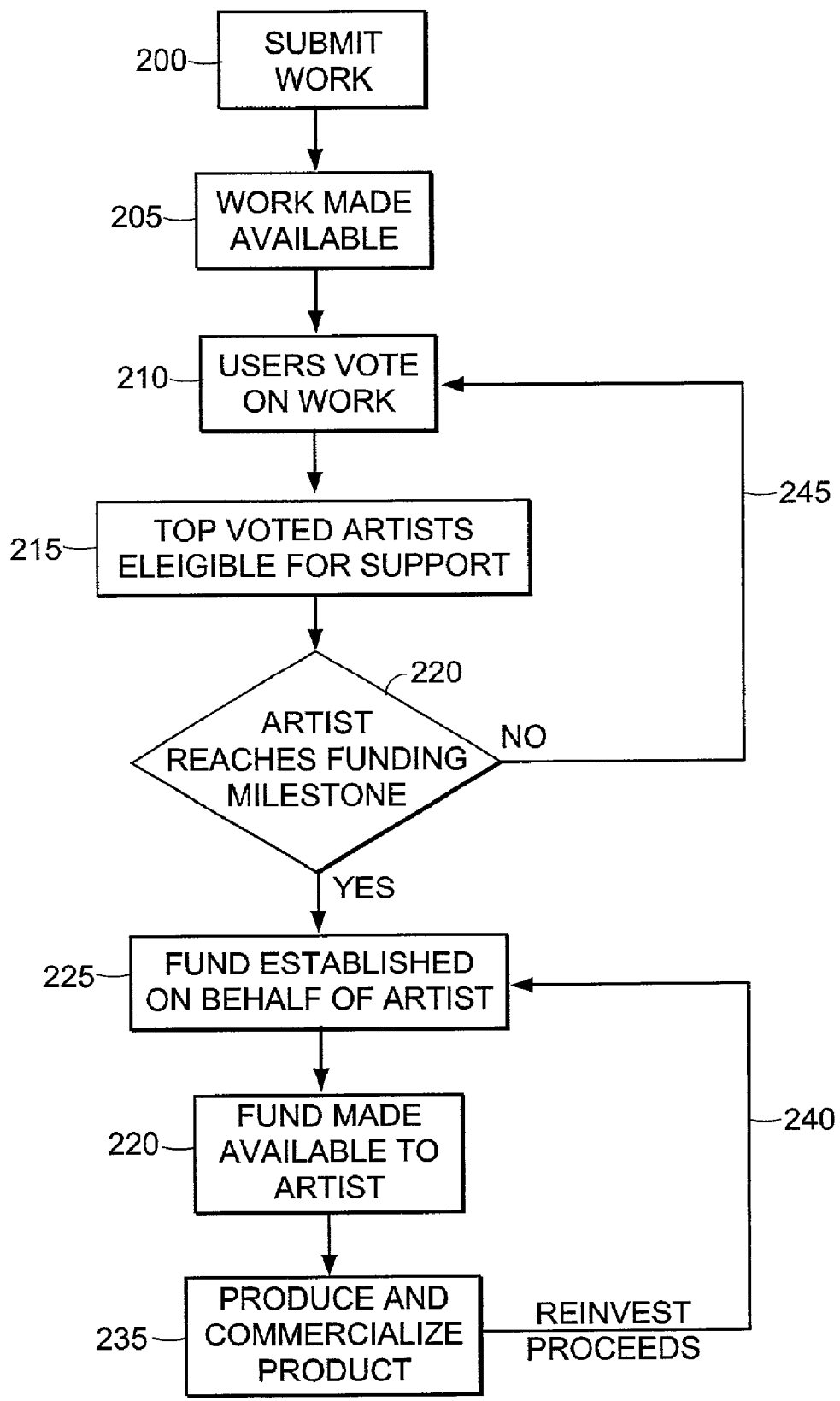
FIG. 3 is a flowchart illustrating the logic of the artist process of the present invention.

Referring to FIG. 3, an artist submits their work, at 200, to be judged by the consuming public. In one preferred embodiment of the present invention, the samples of artists' work are then made available to consumers through a variety of mechanisms including, but not by way of limitation, the telephone, mail service, retail stores, and/or the Internet or other networked device.

According to another embodiment of the present invention, the work is then made available, at 205, through a URL or virtual network or other networked computer or server. Consumers accessing the URL or server review the work submitted by artists and then judge the works by voting, at 210, for their favor artist or artists. A predefined number of artists who receive the largest number of votes become eligible to receive financial backing, at 215, from consumers. (Alternatively, some artists can be promoted based on the decision of a panel of experts or a system administrator.) Once these eligible artists obtain a predefined number of financial supporters, at 220, with each supporter contributing a predefined amount, the fund containing the consumer contributions, minus a commission paid to the manager of the system, becomes available for use for the benefit of the artist, at 225. The fund can then be used, at 230, on behalf of the artist to produce and commercialize the artist, at 235. The proceeds from the sale of any products produced using the fund may be returned, at 240, to the fund. In one embodiment, after a predefined time, and if the artist meets a predefined set of milestones, the artist can withdraw the fund and use it in any manner he or she sees fit. If an artist, eligible to receive contributions, fails to meet their funding milestone within a predefined time period the artist is placed, at 245, back into the general pool of artists.

It would be obvious to those skilled in the art to apply the above method and system to a wireless network or other file sharing architecture. Alternatively, the present invention could be altered such that every artist would be eligible to be financially supported by consumers and not just a predefined number of those with the greatest number of votes. According to another embodiment, as noted above, a predefined number of artists eligible to receive financial support from consumers are picked by a panel of individuals or the administrator of the system and the remaining positions are determined by votes from consumers.

The present invention also provides for aggregating demographic and other data about the consumers supporting a particular artist that allows the artist and/or management company to more efficiently allocate resources and distribute their product with greater efficiency. Such information includes, but not by way of limitation, information about where customers are geographically located, median income, age, sex, and/or level of education attained. This information provides a consumer database to which the artist or company can market directly.

Logic of the Consumer Process

Figure 4:
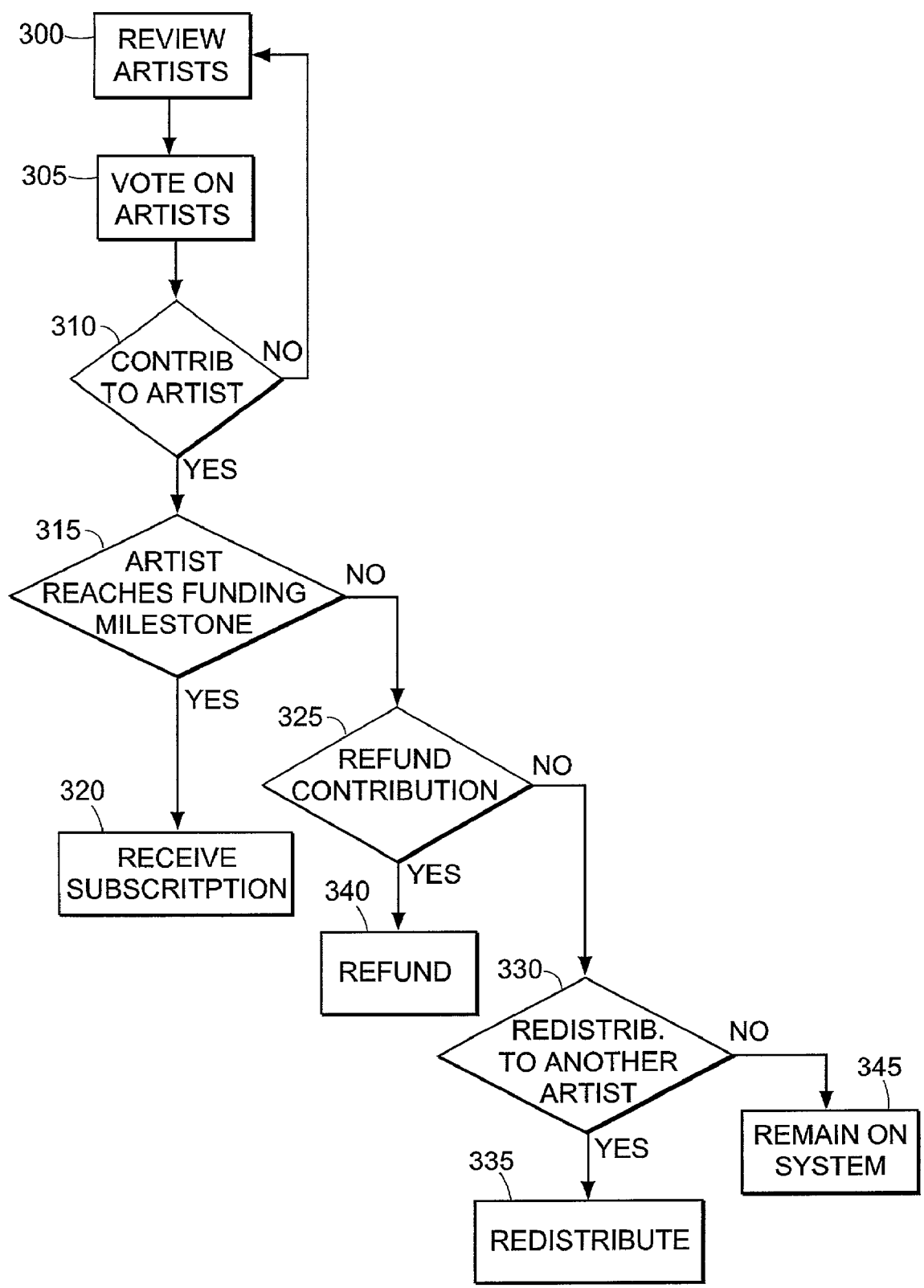
FIG. 4 is a flowchart illustrating the logic of the consumer process of the present invention.

Referring to FIG. 4, a consumer reviews the artists' work, at 300, through a variety of mechanisms including, but not by way of limitation, the telephone, retail store audio display, direct mailing, and/or the Internet or other networked device. In this illustrated embodiment, after reviewing the artists' work, the consumer, and/or another body, makes a determination of which artist(s) he or she prefers and votes, at 305, on the works accordingly. Of the top voted artists, set apart in a support group, the consumer makes a determination, at 310, of whether or not to financially contribute and support an artist from this group. If the consumer decides to financially contribute and support a particular artist in the support group and that artist meets a predefined level of financial support, at 315, the consumer receives a recognition certificate, at 320, regarding that artist. According to another embodiment of the present invention, a recognition certificate to an artist can attain real value for the consumer because only a predefined number of consumers are allowed to contribute to any one artist. However, if the artist does not obtain that level of predefined support, the consumer is entitled to a refund, at 325, of their contribution or provided an opportunity, at 330, to redistribute their contribution, at 335, to another artist. If the consumer decides neither to elect a refund, at 340, or to contribute, at 345, to another artist, he or she can chose to leave the money, at 345, on the system undistributed for a period of time.

According to one embodiment of the present invention, a predefined number of the top voted artists are eligible to receive financial support from consumers. According to another embodiment, a predefined number of positions are established in which artists in those positions are eligible to receive contributions from consumers. These positions are filled by the eligible artists and these artists remain in these positions until either they receive a predefined level of consumer contributions or a predefined period of time lapses. Thus, other artists who become eligible subsequently will only advance to the next level when these positions eligible to receive consumer contributions become vacant.

Artist as Musican Embodiment

Figure 5:
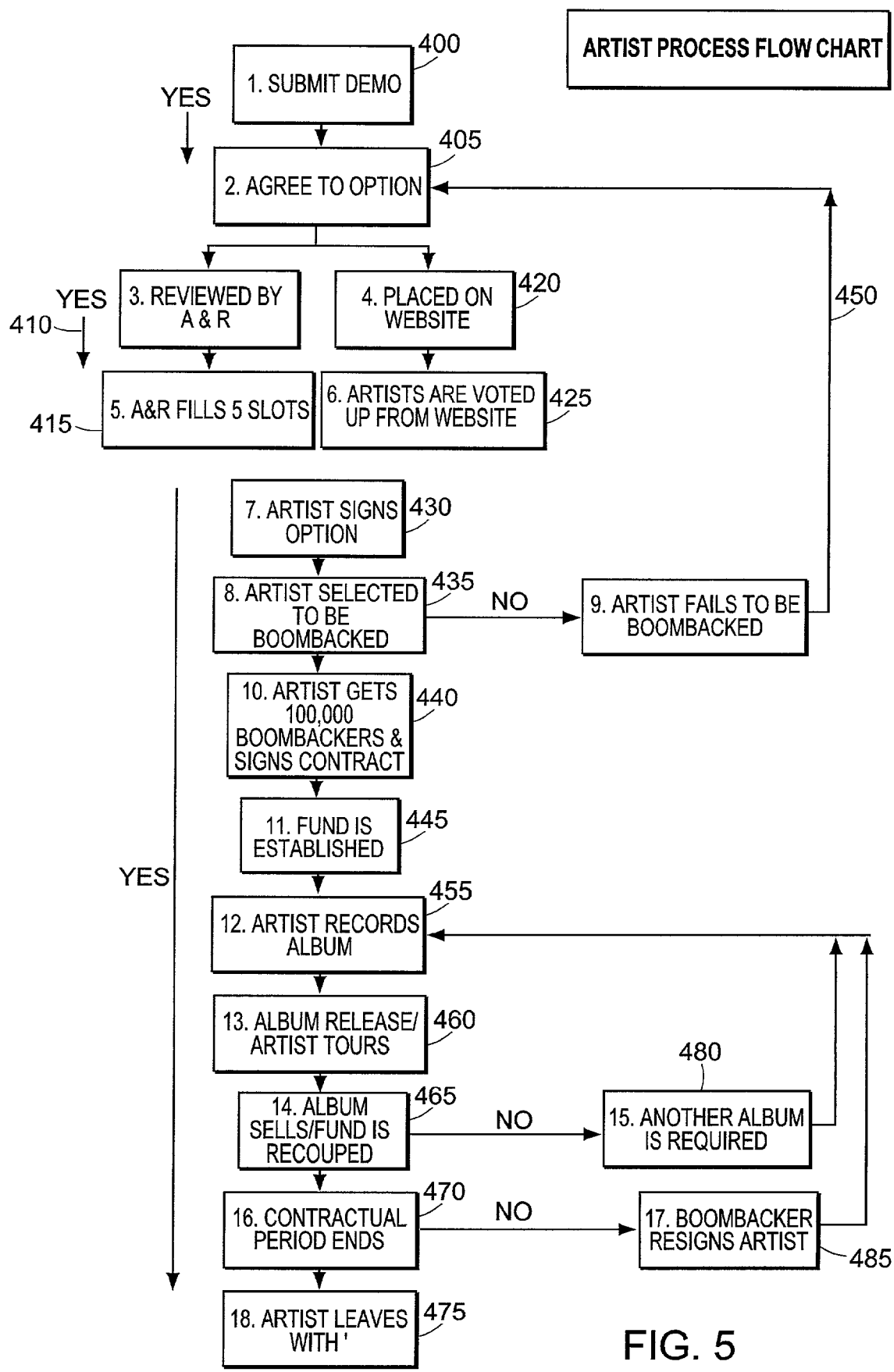
FIG. 5 is a flowchart illustrating the logic of the artist process of the present invention where the artist is a musician.

Referring to FIG. 5, in one particular embodiment of the present invention, a musician or musical act submits a demo, at 400, of their music to BoomBacker either by sending the demo electronically to a URL or using another submission method such as the U.S. Postal Service. Upon submission of the demo, the artist signs an option contract, at 405, that requires the artist to sign a recording contract with Boom-Backer if certain milestone events occur. Once the option contract is signed, the demo is reviewed, at 410, by a panel similar to an A&R department of a record company or another administrator of the system. Once the demo is reviewed, there are two possible next paths. One, the demo may be selected, at 415, by the panel similar to an A&R department or an administrator of the system to immediately become eligible for financial contributions by fans. (This is known as the chance to be "BoomBacked.") Two, the demo is placed in a general pool of artists, at 420, that fans can review and vote on, at 425. If an artist from this general pool receives a predefined number of votes, the artist becomes available to be elected to the support group and receive financial contributions from fans, at 435. Once an artist, made eligible either by an A&R selection or by fan voting, receives a predefined number of contributing fans, the artist becomes eligible to sign a contract, at 440, with Boom-Backer (that is, BoomBacker exercises its option) and, subsequent to the signing of the contract, funds contributed by the fans are transferred to a fund or an account, at 445, on behalf of the artist. However, if an artist eligible for fan funding fails, at 450, to obtain the predefined number of contributing fans within a predetermined time period, that artist is sent back to the general pool of artists (and fan support is reset to "zero").

According to another embodiment of the present invention, an artist can be eligible to sign a contract with Boom-Backer, and thus eligible for BoomBacker funds, upon submitting a demo and before fans have an opportunity to review and vote on the artist.

After establishing the fund for the artist, the funds become available to be used for the benefit of the artist on a limited basis, for the artist to, but not by way of limitation, record an album, at 455, commercialize the album, merchandise, distribute, and/or tour, at 460, in support of their album. According to one embodiment of the present invention, a commission is taken for the fund created by fan contribution based on the value of the fund. The commission represents a service fee for bringing artists and fans together. Proceeds from album sales may be reinvested, at 465, in the fund. The artist will, after meeting contractual obligations, at 470, be allowed to receive, at 475, all the funds in the trust. According to one embodiment of the present invention, the aforementioned contractual obligations include completing another album, at 480. According to another embodiment of the present invention, the artist and BoomBacker may re-sign, at 485, a subsequent contract after the term of the initial contract ends.

Consumer as Fan Embodiment

Figure 6:
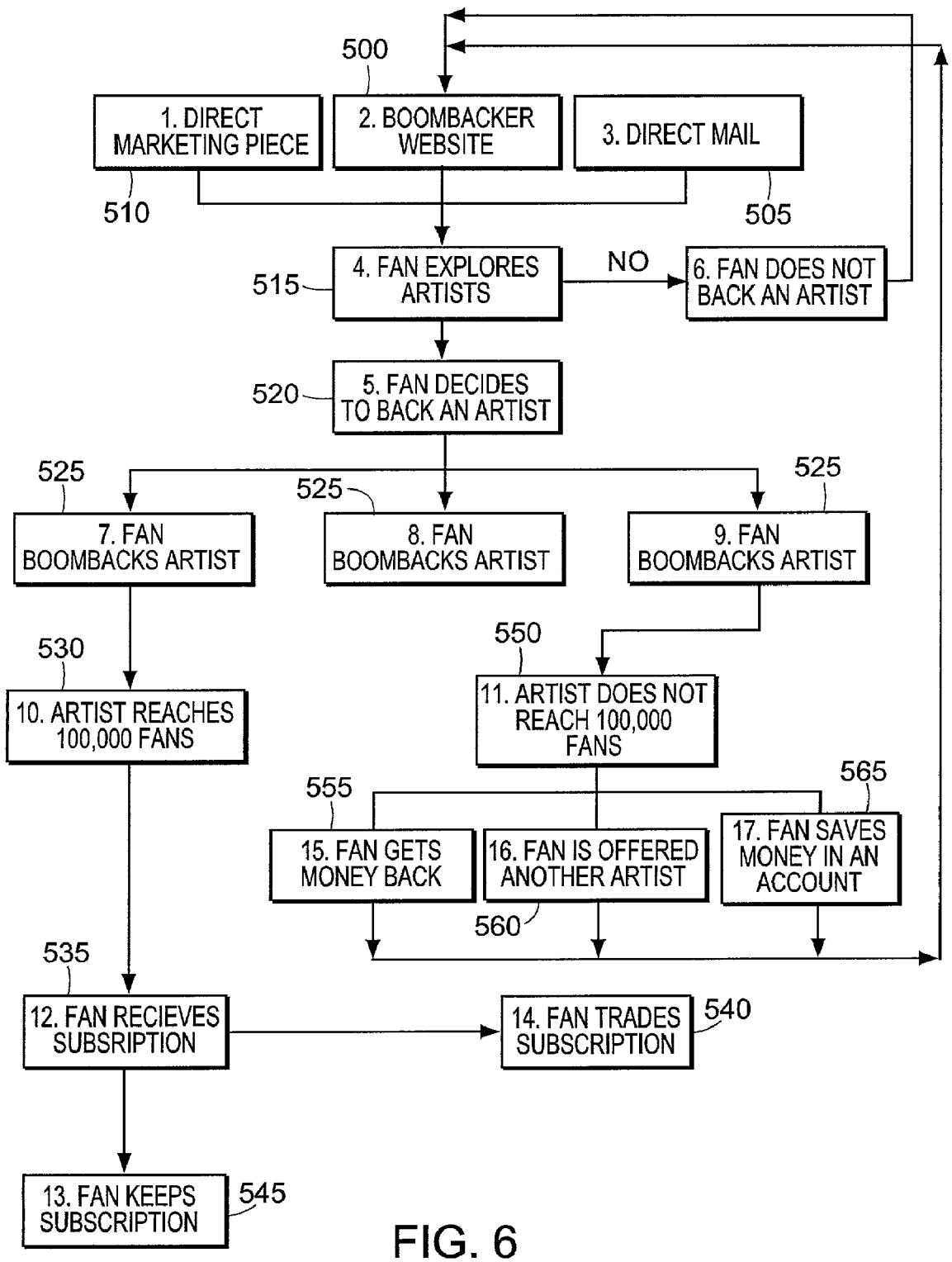
FIG. 6 is a flowchart illustrating the logic of the consumer process of the present invention where the consumer is a fan.

Referring to FIG. 6, is another aspect of the present invention, a fan accesses, a web-site through a URL or through another networked device. According to one embodiment of the present invention, the URL is Boom-Backer.com, at 500. According to an alternative embodiment, the fan can become aware of artists through traditional means such as direct mail, at 505, or other direct marketing, at 510, and/or a retail store audio display. According to the URL embodiment of the present invention, once at the web-site, the fan explores artists, at 515. The artists can be divided into classes or genre type. Within each type or genre, the artists can be broken down into a list or ranking with the artist with the largest number of fan votes on the top and those with the fewest votes on the bottom. According to one embodiment of the present invention, the top ten artists selected from across all groups, are made eligible to be BoomBacked or, in other words, receive contributions from fans. Alternatively, the top ten artists from across all groups are only eligible to be to receive contributions from fans provided the number of eligible positions are not already filled by eligible artists.

Fans vote on an artist(s) from the available artist pool and can also decide, at 520, to financially contribute, at 525, a predefined amount of money for an artist eligible for such contributions. If the artist in which the fan decides to financially contribute obtains a predefined number of fans or level of financial support, at 530, the fan receives a recognition certificate, at 535, regarding the artist. According to one embodiment of the present invention, the recognition certificate grants the fan certain privileges. Privileges include, but not by way of limitation, discounts on merchandise associated with the artist, advanced notice of tour dates, discounts on concert tickets and music, access to privileged information about that artist as well as "reality" video and film highlighting the artist's personal life and career, and opportunities to meet and chat with the artist at special receptions before personal appearances. Under another embodiment of the present invention, the number of fans permitted to contribute to an artist is limited to a predefined number based on the amount of money each fan is allowed to contribute to the artist. By limiting the number of contributing fans, the recognition certificate granted a fan once an artist becomes BoomBacked has value, which can be realized by trading the membership, at 540, with another fan either for monetary value or a recognition certificate, or group of recognition certificates, in another artist(s). Alternatively, the fan can keep the recognition certificate, at 545.

Alternatively, if the artist the fan contributed to fails, at 550, to obtain a predefined number of contributing fans or financial support, that fan has the option of receiving his or her money back, at 555, transferring it to another eligible artist, at 560, or saving the money in a non-artist fund, at 565, maintained by the system for a predetermined period of time.

Figure 7:
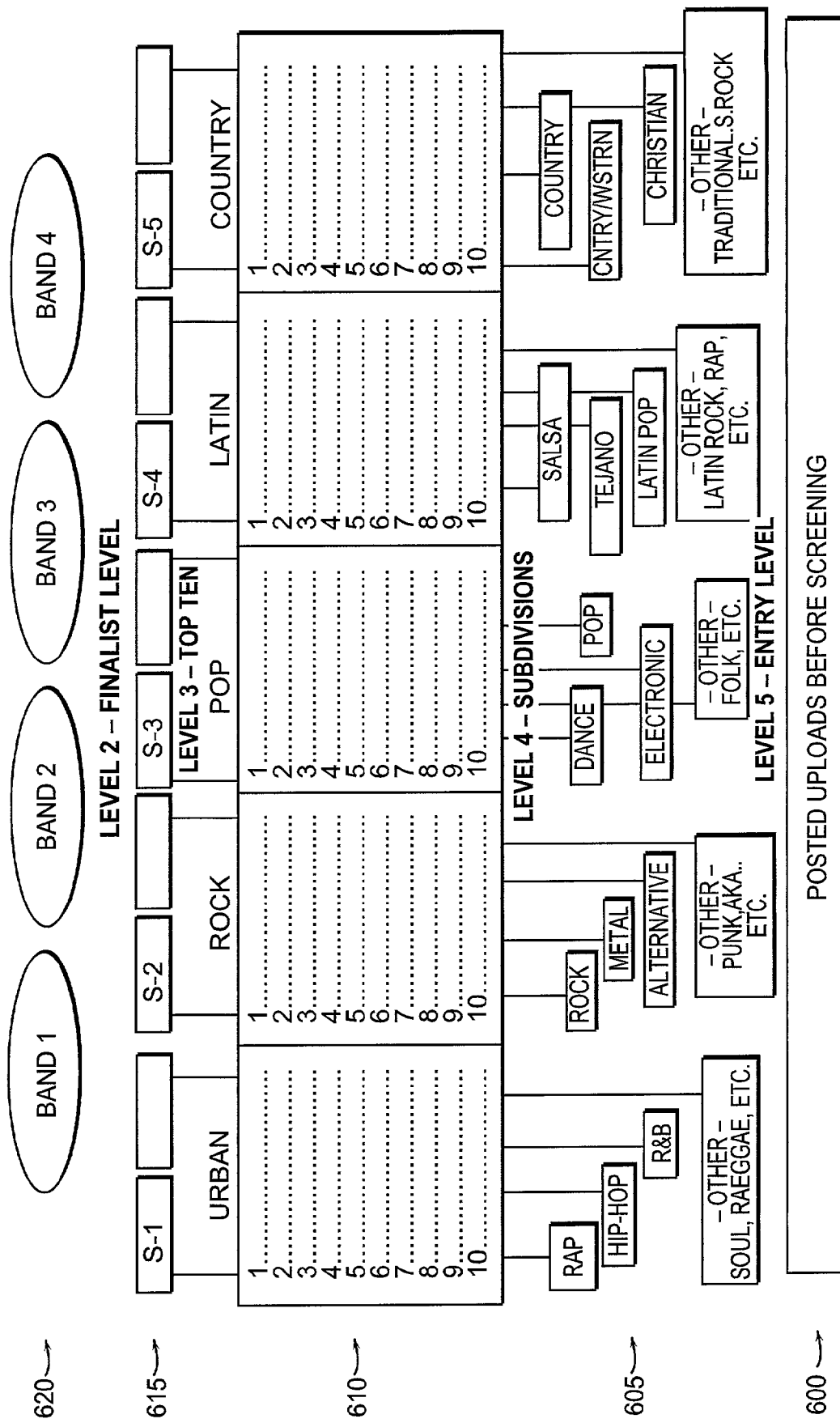
FIG. 7 is a diagram illustrating the organization of artists on a promoting site.

Referring to FIG. 7, the organization of the artists demonstrating their music on the BoomBacker system is generally broken down into five levels, with each level representing a different stage in the advancement of an artist to becoming BoomBacked. Level 5, at 600, is the lowest level and is where artists just posting a demo of their music reside. According to one embodiment of the present invention, artists are screened at this level by a panel of individuals or a system administrator and a determination is made whether to elevate the demo to the next level. Level 4, at 605, is where the demos of music are posted on the web site or otherwise made available for fans to review. Mechanisms for viewing demos of music include, but not by way of limitation, the telephone, television programs, retail store audio displays, direct marketing, mail service, and/or the Internet or other networked device. It is also at this stage that fans vote on their favorite artists and thereby select those artists who will move up to level 3. Level 3, at 610, consists of those artists, here 10 in number, who have received the largest number of fan votes (or have been advanced by the "panel" or administrator) in their genre. Level 2, at 615, represents artists who are eligible to receive contributions from fans. According to one embodiment of the present invention, the artists in level 2, at 615, represent artists receiving the largest number of votes in their genre. After an initial start-up period, a vacancy in level 2 are filled by the artist in level 3 having the most votes. According to an alternative embodiment of the present invention, a predefined number of artists in level 2, at 615, is selected by a panel similar to an A&R department or system administrator from any of the lower levels, preferably level 4 and, the other available positions in level 2, at 615, are filled by artists with the greatest number of fan votes. Upon reaching level 2, at 615, artists have a predefined period of time to obtain the necessary support in order to become eligible for any monies. Thus, according to one embodiment of the present invention, an artist remains at level 2, at 615, until they obtain either 100,000 contributing fans or until six months or other predetermined time has passed, which ever occurs first. If an artist fails to obtain the necessary support to become BoomBacked, the artist returns to level 3 and the process begins all over again for that artist. Level 1, at 620, represents artists that have obtained a predefined level of contributions from fans. According to one embodiment of the present invention, this predefined level is reached when the artist has 100,000 fans that have contributed twenty-five dollars each. It is at level 1, at 620, that artists sign a contract as per the option agreement signed upon the submission of artists' work to BoomBacker (for example a record contract) and becomes eligible to receive all BoomBacker services and benefits. BoomBacker services and benefits include, but not by way of limitation, medical insurance, life insurance, profit sharing, and/or a BoomBacker fund. Benefits also may include financial support for their work and a retirement fund, both of which, in amount, depend on the artist's level of success.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for determining the market demand for an artist comprising:
   receiving by one or more CPUs user input to determine which artists to select from a pool of artists;
   determining by the one or more CPUs the market demand for each said selected artist based on users contributing money to a separate fund for each said artist;
   identifying by the one or more CPUs artists that attain a predefined money level of user contributions, and providing said fund, minus a commission, for the benefit of each artist in response to the fund attaining the predefined money level of user contributions; and
   providing each of at least one of the users who contributed to artists that did not attain the predefined money level of user contributions an option to be selected from a group at least comprising:
   (a) a refund of the money contribution;
   (b) a redistribution of the money contribution to another artist from the pool of artists; and
   (c) to leave the money contribution undistributed in a non-artist account; and
   executing instructions by the one or more CPUs that result in the selected option being provided to the user.

2. A method according to claim 1 wherein said user input is in the form of user votes.

3. A method according to claim 1 further comprising giving users contributing money to an artist who attains a predefined money level of user contributions a recognition certificate regarding said artist.

4. A method according to claim 1 further comprising making available to each artist attaining a predefined money level of user contribution, funds from the users' contribution to the artist to produce and commercialize the artist.

5. A method according to claim 4, further comprising using said funds to produce a record from said funds when said artist is a musician.

6. A method according to claim 1 further comprising maintaining information on said users, and using said information to market said artist.

7. A method according to claim 1 comprising limiting the number of users permitted to contribute money to said artist to a predefined number.

8. An apparatus for determining the market demand for an artist comprising:
   means for receiving user input to determine which artists to select from a pool of artists;
   means for determining the market demand for each said selected artist based on users contributing money to a separate fund for each said artist;
   means for identifying selected artists that attain a predefined money level of user contributions, and providing said fund, minus a commission, for the benefit of each artist in response to the fund attaining the predefined money level of user contributions; and
   means for providing each of at least one of the users who contributed to artists that did not attain the predefined money level of user contributions an option to be selected from a group at least comprising:
   (a) a refund of the money contribution;
   (b) a redistribution of the money contribution to another artist from the pool of artists; and
   (c) to leave the contribution undistributed in a non-artist account, and
   executing instructions by the one or more CPUs that result in the selected option being provided to the user.

9. A method for an artist to obtain financial support comprising:
   receiving and storing on a file server a sample of the artist's work;
   evaluating the stored artist work from a pool of artists;
   selecting by one or more CPUs an artist based on said artist's work to be eligible for financial contributions from users, wherein the financial contributions are money;
   establishing a fund of any such contributions for an artist;
   determining by the one or more CPUs whether the artist achieved a certain level of contributions being made;

providing at least a substantial portion of the fund to the artist in response to the certain level of contributions being made; and providing each of at least one of the users who contributed to artists that did not meet the certain level of contributions an option to be selected from a group at least comprising:

(a) a refund of the money contribution;
(b) a redistribution of the money contribution to another artist from the pool of artists; and
(c) to leave the money contribution undistributed in a non-artist account, and executing instructions by the one or more CPUs that result in the selected option being provided to the user.

10. The method of claim 9 further comprising returning the selected artist to the pool of artists if the selected artist fails to meet the certain level.

11. The method of claim 9 wherein selecting an artist to be eligible for financial support is based on the artist who attains the largest number of user votes.

12. The method of claim 9 wherein selecting an artist to be eligible for financial support is determined by a panel of individuals.

13. The method of claim 9 wherein selecting an artist to be eligible for financial support is determined in part by a panel of individuals and in part by user votes.

14. A computer implemented system for determining the market demand for an artist comprising:

a file server; and
one or more processors implementing instructions to:
receive and store user input on said file server to determine which artists to select from a pool of artists;
determine the market demand for each said selected artist based on users contributing money to a separate fund for each said artist;
identify artists that attain a predefined money level of user contributions, and provide said fund, minus a commission, for the benefit of each artist in response to the fund attaining the predefined money level of user contributions; and
provide each of at least one of the users who contributed to artists that did not meet the predefined money level an option to be selected from a group at least comprising:
(a) a refund of the money contribution;
(b) a redistribution of the money contribution to another artist from the pool of artists; and
(c) to leave the money contribution undistributed in a non-artist account execute instructions that result in the selected option being provided to the user.

15. The system of claim 14 further comprising instructions for selecting artists from a pool of artists using inputs from a panel of individuals.

16. The system of claim 14 wherein the number of artists that can be selected to receive financial support from the pool of artists is predefined.

17. A computer implemented system for presenting artists to determine market demand for artists comprising a computer having instructions for implementing the method of:
receiving and storing work of artists on a file server;
categorizing by one or more CPUs said work into categories;
selecting said work from said categories;
elevating selected works into positions that are eligible to receive direct financial support from users, wherein the financial support is money;
receiving by the one or more CPUs the direct financial support from users;
promoting by the one or more CPUs the artists who receive a predefined amount of direct financial contributions, and providing the financial contributions, minus a commission paid to the manager of the system, for the benefit of the artist in response to the artists receiving the predefined amount of direct financial contributions; and
providing each of at least one of the users who contributed to artists that did not meet the predefined amount an option to be selected from a group at least comprising:
(a) a refund of the money contribution;
(b) a redistribution of the money contribution to another artist; and
(c) to leave the money contribution undistributed in a non-artist account, and
execute instructions by the one or more CPUs that result in the selected option being provided to the user.

18. The system of claim 17 comprising instructions for limiting the number of positions available to receive financial contributions from users.

19. An article comprising a computer-readable medium that stores computer-executable instructions for causing a computer system to:
receive user input to determine which artists to select from a pool of artists;
determine the market demand for each said selected artist based on users contributing money to a separate fund for each said artist;
identify artists that attain a predefined money level of user contributions, and provide said fund, minus a commission, for the benefit of each artist in response to the fund attaining the predefined money level of user contributions; and
provide each of at least one of the users who contributed to artists that did not meet the predefined amount an option to be selected from a group at least comprising:
(a) a refund of the money contribution;
(b) a redistribution of the money contribution to another artist from the pool of artists; and
(c) to leave the money contribution undistributed in a non-artist account, and
execute instructions in the one or more CPUs that result in the selected option being provided to the user.

20. The article of claim 19 wherein users select and contribute to an artist through a network connection.

21. A computer implemented apparatus for determining market demand for an artist comprising:
means for receiving and storing works of artists;
means for enabling users to access the stored works;
means for receiving user input to elevate artist from the general artist pool;
means for making elevated artists eligible for financial contributions from users, wherein the financial contributions are money;
means for making financial contributions from users, wherein the financial contributions are money, available to artists in response to the financial contributions reaching a certain level of contributions; and
means for providing each of at least one of the users who contributed to artists that did not meet the level of contributions an option from a group at least comprising:
(a) a refund of the money contribution;
(b) a redistribution of the money contribution to another artist from the general artist pool; and (c) to leave the money contribution undistributed in a non-artist account, and execute instructions in the one or more CPUs that result in the selected option being provided to the user.

22. A method for determining the market demand for an artist, said method comprising:

receiving by one or more CPUs input from a plurality of users to at least one of a plurality of artists;

selecting at least one artist from said plurality of artists to receive financial contributions from said plurality of users; end identifying by one or more CPUs from said plurality of artists at least one artist that receives a predefined amount of said financial contributions, and providing the financial contributions, minus a commission, for the benefit of the artist in response to the artist receiving the predefined amount of financial contributions, wherein the financial contributions are money; and providing each of at least one of the users who contributed to artists that did not meet the predefined amount of financial contributions an option from a group at least comprising:

(a) a refund of the money contribution;

(b) a redistribution of the money contribution to another artist from the general artist pool; and (c) to leave the money contribution undistributed in a non-artist account, and executing instructions in the one or more CPUs that result in the selected option being provided to the user.

\* \* \* \* \*